United States Patent [19]

Witzig et al.

[11] Patent Number: 5,686,057
[45] Date of Patent: Nov. 11, 1997

[54] SELECTIVE OXIDATION OF HYDROGEN SULFIDE IN MOLTEN SULFUR

[75] Inventors: William L. Witzig, Montgomery; Scott E. Lehrer, The Woodlands, both of Tex.

[73] Assignee: BetzDearborn Inc., Trevose, Pa.

[21] Appl. No.: 747,885

[22] Filed: Nov. 13, 1996

[51] Int. Cl.$^6$ .............................. C01B 17/04; C01B 17/05
[52] U.S. Cl. .................................................. 423/578.1
[58] Field of Search .......................................... 423/578.1

[56] References Cited

U.S. PATENT DOCUMENTS

| | | | |
|---|---|---|---|
| 3,278,269 | 10/1966 | Ekker et al. | 23/224 |
| 3,619,143 | 11/1971 | Ortuno et al. | 423/578.1 |
| 4,256,728 | 3/1981 | Nishino et al. | 422/4 |
| 4,844,720 | 7/1989 | Pendergraft et al. | 55/73 |
| 5,080,695 | 1/1992 | Kassarjian | 55/53 |

FOREIGN PATENT DOCUMENTS

| | | | |
|---|---|---|---|
| 346835 | 4/1931 | United Kingdom | 423/578.1 |
| 1433822 | 4/1976 | United Kingdom . | |

OTHER PUBLICATIONS

Evaluation of Chemicals to Control The Generation of Malodorous Hydrogen Sulfide In Waste Water: Tomar, M. and Adbdullah, T.; Water Resources, vol. 28, No. 12, pp. 2545–2552, 1994 (No Month).

A New Process for Controlling Effluent Treatment Odours: Valentin,F.H.H.; BHR Group Conference Series Publication(1993) No Month, Second International Conference on Advances in Water and Effluent Treatment, 107–117.

Liquid Catalyst Efficiently Removes H2S From Liquid Sulfur: Nougayrede, J. and Voirin, R.; Oil & Gas Journal, Jul. 17, 1989, pp. 65–69.

*Primary Examiner*—Gary P. Straub
*Assistant Examiner*—Timothy C. Vanoy
*Attorney, Agent, or Firm*—Alexander D. Ricci; Steven D. Boyd

[57] ABSTRACT

A method for inhibiting hydrogen sulfite evolution from molten sulfur is disclosed. The method involves adding a hypohalide to molten sulfur containing hydrogen sulfite. The hypohalide, such as hypochlorite, hyprobromite, and their sodium or calcium salts inhibit the evolution of hydrogen sulfite from molten sulfur.

3 Claims, No Drawings

SELECTIVE OXIDATION OF HYDROGEN SULFIDE IN MOLTEN SULFUR

FIELD OF THE INVENTION

The present invention relates to the control of degassification of molten sulfur. More particularly, the present invention relates to the control, by selective oxidation, of the release of dissolved hydrogen sulfide from molten sulfur produced by the Claus process.

BACKGROUND OF THE INVENTION

The present invention relates to a process for inhibiting hydrogen sulfide released from molten sulfur. Elemental sulfur is produced on a commercial scale according to the Claus process in which hydrogen sulfide and oxygen react to produce elemental sulfur and water. The sulfur produced is separated, in the molten form, in sulfur condensers and withdrawn for transportation or use such as in the production of sulfuric acid.

An inherent feature of this process is the presence, in the produced molten sulfur, of dissolved hydrogen sulfide which not only contaminates the product but also poses potential hazards in several areas. In addition to creating nuisance odors in the vicinity of molten sulfur, hydrogen sulfide may be present in such quantities as to reach toxic levels when loading and unloading the sulfur. Further, when dissolved hydrogen sulfide in molten sulfur contaminates the vapor space in storage tanks and vessels, there is a threat that the lower explosive limit of hydrogen sulfide will be reached.

Normally in a gas/liquid system the adsorption rate of the gas is lower at higher temperatures. Thus, in principle, the hot, molten sulfur stream in contact with a gaseous phase containing hydrogen sulfide, as found in a Claus plant, should not represent a serious problem if dissolution is the only adsorption process. However, hydrogen sulfide is known to combine with the sulfur to form hydrogen polysulfides. The formation of the polysulfides is favored at the high temperatures of the Claus process. This is particularly true during the initial oxidation step in the furnace and boiler where the major portion of the sulfur is also produced. Unfortunately, the kinetics of the reverse reaction at lower temperatures characteristic of hydrogen sulfide removal are extremely slow. Thus, the polysulfides are inherently produced in the Claus process, and once formed are extremely slow in decomposing. Consequently, the apparent solubility of hydrogen sulfide in liquid sulfur is unexpectedly high due to the formation of polysulfides. The subsequent release or removal is slow and difficult, frequently involving significant quantities of hydrogen sulfide being released.

In response to this problem a number of methods have been suggested or developed to remove hydrogen sulfide from molten sulfur produced by the Claus process. Release of dissolved hydrogen sulfide has been carried out by agitating the molten sulfur by various means, by providing a sulfur lift through air bubbles and by circulating the sulfur over a stripping column. Mechanical agitation has also been employed. Released hydrogen sulfide is often removed by a sweep gas such as air, Claus tail gas or nitrogen.

The use of solid catalyst to convert hydrogen polysulfide to hydrogen sulfide and removal with a purge gas containing oxygen is disclosed in U.S. Pat. No. 4,844,720. United Kingdom Patent Specification 1,433,822 discloses the use of a nitrogen containing compound and an oxidizing gas to convert hydrogen polysulfides to hydrogen sulfide which is removed from molten sulfur. Exemplary nitrogen containing compounds disclosed therein are ammonia, amines including alkylamines or hydroxyalkylamines or urea or substituted urea.

The removal of odor from air or gas streams by scrubbing with a dilute alkaline solution of sodium hypochlorite and passing the solution through a nickel-based catalyst on a ceramic matrix is disclosed by Valentin et al. in the A New Process for Controlling Effluent Treatment Odors, BHR Group Conference Series Publication (1993), Second International Conference on Advances in Water and Effluent Treatment 1993, pages 107–117.

The effects of hydrogen peroxide, sodium/calcium hypochlorite and ferrous/ferric salts on hydrogen sulphide desolved in waste water is described in Evaluation of Chemicals to Control The Generation of Malodorus Hydrogen Sulfide in Waste Water, M. Tomar and T. Abdullah, Water Resources Volume 28 No. 12, pages 2545–2552, 1994.

SUMMARY OF THE INVENTION

The present inventors discovered a new method for controlling the odor and hazaards resulting from hydrogen sulfide gas evolution from molten sulfur. The method of the present invention selectively oxidizes hydrogen sulfide in molten sulfur by the addition of a hypohalide such as hypochlorite. The method of the present invention involves adding hypohalides to molten sulfur. It was discovered that hypohalides selectively oxidize hydrogen sulfide. The selective oxidation of hydrogen sulfide inhibits the evolution of hydrogen sulfide gas from the molten sulfur. By selective oxidation, it is meant that even in molten sulfur, where hydrogen sulfide concentrations are very low (as low as 10 ppm), the hypohalides oxidize the hydrogen sulfide preferentially over sulfur. This is evidenced by the efficacy of hypohalides in controlling hydrogen sulfide gas in the headspace over molten sulfur containing hydrogen sulfide.

DETAILED DESCRIPTION OF THE PREFERRED EMBODIMENT

The present inventors have discovered that the problems resulting from hydrogen sulfide gas evolution from molten sulfur could be controlled by treatment with a hypohalide. The addition of a hypohalide to molten sulfur was found to inhibit the volatilization of hydrogen sulfide gas. The preferred hypohalide is hypochlorite. It is believed that other hypohalides such as hypobromite will also provide this unexpected result. Commercially, hypochlorite compounds are usually supplied as salts of sodium or calcium; NaOCl or Ca(OCl)$_2$, respectively. The addition of such salts of hypochloride to molten sulfur was found to selectively oxidize hydrogen sulfide, a relatively minor component of sulfur prepared via the Claus process. The following is a possible reaction pathway for the reaction of sodium hypochlorite with hydrogen sulfide.

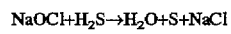

$$NaOCl + H_2S \rightarrow H_2O + S + NaCl$$

The hypohalide of the present invention may be added in an amount ranging from about 1 to 1,000 moles hypohalide per mole of hydrogen sulfide or hydrogen polysulfide present in the system being treated. The molten sulfur treated in accordance with the present invention is typically at a temperature of from about 115° C. to 450° C. The hypohalide of the present invention is preferrably added continuously to molten sulfur although batchwise addition may be employed. The hypohalide of the present invention may be added as an aqueous stream having a hypohalide concentration of from about 1% to 10% at a pH of from about 7–14.

The present invention will now be further described with reference to a number of specific examples which are intended to be illustrative and not as restricting the scope of the present invention.

Testing was conducted using a molten sulfur sample collected from a Claus unit at a Gulf Coast refinery as well as with a sample of reagent grade elemental sulfur. The sulfur was liquefied and added to vials for headspace gas chromatography. While maintaining the sulfur in the molten state, the sulfur in the vials was overpressured at 10 psig with a mixed gas containing 2000 ppm $H_2S$ in nitrogen. The vials were placed in an oven at 138° C. for approximately 16 hours to achieve equilibration of the $H_2S$ between the vapor and liquid phases. Treatments were added to the molten sulfur and allowed a 16 to 18 hour reaction period with the molten sulfur at 138° C. These conditions were chosen to be representative of both the temperature and residence time of sulfur in a sulfur pit.

$H_2S$ concentrations above the molten sulfur were analyzed by gas chromatography using a detector specific for sulfur compounds. Results of these analyses are shown below for four experiments, tests 1–4.

TEST #1
Sulfur - Sample form Gulf Coast Refinery
Untreated Headspace $H_2S$ Average = 1020 ppm
ppm $H_2S$ - Avg.
Treatment

| ppm Active | 5.25% NaOCl | Hydrogen Peroxide |
| --- | --- | --- |
| 10 | 790 | 911 |
| 25 | 209 | 1045 |
| 50 | 11 | 911 |
| 100 | <15 | 649 |
| 250 | 16 | 274 |

TEST #2
Sulfur - Sample from Gulf Coast Refinery
Untreated Headspace $H_2S$ Average - 798 ppm Sodium Perborate
5% in $H_2O$

| ppm Active | ppm $H_2S$ - Average |
| --- | --- |
| 10 | 828 |
| 25 | 363 |
| 50 | 174 |
| 100 | 138 |

TEST #3
Sulfur - Sample from Gulf Coast Refinery
Untreated Headspace $H_2S$ Average - 360 ppm
ppm $H_2S$ - Avg.
Treatment

| ppm Active | 12.5% NaOCl |
| --- | --- |
| 10 | <50 |
| 20 | <50 |
| 30 | 48 |
| 40 | <50 |
| 50 | <50 |
| 70 | <50 |

TEST #4
Sulfur - Reagent Grade Elemental Sulfur
Untreated Headspace $H_2S$ Average = 320
ppm $H_2S$ - Avg.
Treatment

| ppm Active | 12.5% NaOCl |
| --- | --- |
| 2 | 380 |
| 5 | 190 |
| 10 | 240 |
| 20 | <50 |
| 30 | 60 |
| 60 | <50 |

The resulting pH of hypochlorite solutions is between 12 and 13. In all tests of hypochlorite, the ppm active shown in the above tables refers to the ppm added as concentrated sodium hypochlorite.

All experiments except for Test #4 were conducted with sulfur samples collected at a Gulf Coast Refinery. Although there was significant variation in the amount of $H_2S$ measured in the headspace of the untreated vials, the data shows that hypochlorite is effective at inhibiting the generation of hydrogen sulfide from molten sulfur. Additionally, a comparison of hydrogen peroxide and sodium hypochlorite in Test #1, showed that hydrogen peroxide, a known scavenger of hydrogen sulfide in waste water applications, was far less effective and efficient for preventing hydrogen sulfide evolution from molten sulfur. Another oxidant, sodium perborate, was evaluated in Test #2 and found to be far less effective at preventing headspace $H_2S$ compared to sodium hypochlorite. Results for sodium perborate and hydrogen peroxide indicate that those oxidants may be less selective than hypochlorite as oxidants of hydrogen sulfide in a sulfur matrix.

While this invention has been described with respect to particular embodiments thereof, it is apparent that numerous other forms and modifications of the invention will be obvious to those skilled in the art. The appended claims and this invention should be construed to cover all such obvious forms and modifications which are within the true spirit and scope of the present invention.

What is claimed is:

1. A method of inhibiting hydrogen sulfide evolution from molten sulfur comprising adding to molten sulfur a hypohalide in an amount of from about 1 to 1,000 moles hypohalide per mole of hydrogen sulfide, hydrogen polysulfide and combinations thereof present in said molten sulfur.

2. The method of claim 1 wherein said hypohalide is selected from the group consisting of hypochlorite and hypobromite.

3. The method of claim 1 wherein said hypohalide is added to said molten sulfur in the form of a sodium or calcium salt.

* * * * *

UNITED STATES PATENT AND TRADEMARK OFFICE
CERTIFICATE OF CORRECTION

PATENT NO.  : 5,686,057
DATED       : November 11, 1997
INVENTOR(S) : Witzig, et al.

It is certified that error appears in the above-identified patent and that said Letters Patent is hereby corrected as shown below:

<u>In the Abstract</u>:

Please change each occurrence of "sulfite" to ---sulfide---.

Signed and Sealed this

Nineteenth Day of May, 1998

Attest:

Attesting Officer

BRUCE LEHMAN

Commissioner of Patents and Trademarks